（12) United States Patent
Bendel et al.

(10) Patent No.: US 10,662,920 B2
(45) Date of Patent: May 26, 2020

(54) TRAILING-EDGE GIRDER WITH RECTANGULAR CROSS SECTION

(71) Applicant: Senvion GmbH, Hamburg (DE)

(72) Inventors: Urs Bendel, Fockbek (DE); Markus Werner, Felde (DE); Julian Ramm, Kiel (DE); Enno Eyb, Kiel (DE); Lenz Zeller, Felde (DE)

(73) Assignee: Senvion GmbH, Hamburg (DE)

( * ) Notice: Subject to any disclaimer, the term of this patent is extended or adjusted under 35 U.S.C. 154(b) by 205 days.

(21) Appl. No.: 15/631,146

(22) Filed: Jun. 23, 2017

(65) Prior Publication Data

US 2018/0080432 A1 Mar. 22, 2018

(30) Foreign Application Priority Data

Jun. 24, 2016 (DE) .......................... 10 2016 007 675

(51) Int. Cl.
| | |
|---|---|
| *F03D 1/06* | (2006.01) |
| *B29C 65/00* | (2006.01) |
| *B29C 65/52* | (2006.01) |
| *B29L 31/08* | (2006.01) |
| *F01D 5/14* | (2006.01) |

(52) U.S. Cl.
CPC ............ *F03D 1/0683* (2013.01); *B29C 65/52* (2013.01); *B29C 66/54* (2013.01); *F03D 1/0675* (2013.01); *B29L 2031/085* (2013.01); *F01D 5/147* (2013.01); *F05B 2230/23* (2013.01); *F05B 2230/50* (2013.01); *F05B 2230/60* (2013.01); *F05B 2240/301* (2013.01); *F05B 2250/12* (2013.01); *F05D 2230/23* (2013.01); *F05D 2240/301* (2013.01); *F05D 2240/304* (2013.01); *Y02E 10/721* (2013.01); *Y02P 70/523* (2015.11)

(58) Field of Classification Search
CPC ...... F01D 5/147; F03D 1/0683; F03D 1/0675; B29C 66/52; B29C 66/54; B29L 2031/085; F05D 2230/23; F05D 2240/301; F05D 2240/304; F05B 2250/12; F05B 2230/23; F05B 2230/50; F05B 2230/60; F05B 2240/301; Y02E 10/721; Y02P 70/523
See application file for complete search history.

(56) References Cited

U.S. PATENT DOCUMENTS 4,976,587 A * 12/1990 Johnston ............... B64C 27/473
416/226
8,172,542 B2 * 5/2012 Hirano .................. F03D 1/0675
416/226

(Continued)

FOREIGN PATENT DOCUMENTS

DE   10 2010 055 874 B3   4/2012
DE   10 2011 003 560 B4   8/2012

(Continued)

*Primary Examiner* — Igor Kershteyn
(74) *Attorney, Agent, or Firm* — Bay State IP, LLC (57) ABSTRACT

The invention relates to a rotor blade of a wind power plant having two rotor blade half-shells (1, 21) with in each case a leading-edge periphery and a trailing-edge periphery (8a, 22a), which rotor blade half-shells are adhesively fastened to each other along the leading-edge and trailing-edge peripheries (8a, 22) and which in case have a trailing-edge girder (3, 25), and each of the trailing-edge girders (3, 25) at least in certain sections is of rectangular design in a cross section along its longitudinal extent.

14 Claims, 3 Drawing Sheets

(56) References Cited

U.S. PATENT DOCUMENTS

| | | | | |
|---|---|---|---|---|
| 8,529,717 B2* | 9/2013 | Hedges | ............... | B29C 70/083 |
| | | | | 156/83 |
| 8,556,590 B2* | 10/2013 | Esaki | ................... | F03D 1/0675 |
| | | | | 416/226 |
| 8,651,822 B2* | 2/2014 | Esaki | ................... | F03D 1/0675 |
| | | | | 416/226 |
| 2009/0324412 A1* | 12/2009 | Roorda | ................ | F03D 1/0658 |
| | | | | 416/204 R |
| 2011/0031758 A1* | 2/2011 | Mitsuoka | ............... | B32B 15/06 |
| | | | | 290/55 |
| 2012/0027609 A1* | 2/2012 | Ogde | ..................... | B29C 70/86 |
| | | | | 416/226 |
| 2014/0301859 A1* | 10/2014 | Hancock | .............. | F03D 1/0675 |
| | | | | 416/230 |
| 2015/0316028 A1* | 11/2015 | Brekenfeld | .......... | F03D 1/0675 |
| | | | | 416/229 R |

FOREIGN PATENT DOCUMENTS

| | | |
|---|---|---|
| DE | 10 2012 107 932 B4 | 3/2014 |
| DE | 10 2014 221 966 A1 | 4/2016 |

* cited by examiner

TRAILING-EDGE GIRDER WITH RECTANGULAR CROSS SECTION

CROSS REFERENCE TO RELATED APPLICATION

This application claims the benefit of and takes priority from German patent application Ser. No. 10 2016 007 675.5 filed on Jun. 24, 2016, the contents of which are herein incorporated by reference.

BACKGROUND OF THE INVENTION

Field of the Invention

The invention relates to a rotor blade and to a method for producing a rotor blade.

Description of the Related Art

Rotor blades for wind power plants are of course well known in the prior art.

Disclosed in DE 10 2012 107 932 B4 is a rotor blade which consists of a fibre composite system. In this case, rotor blade half-shells are first of all produced and adhesively fastened to each other. For stabilising the rotor blade half-shell in the impact direction, that is to say perpendicularly to the pivoting direction, or rotor plane in which the rotor blade rotates, provision is made between the rotor blade half-shells for ribs which are adhesively fastened to the rotor blade half-shells via girders. Girders and ribs form a double-T beam in cross section. In rotor blades, provision is made on the rotor blade half-shells in each case for a main girder which extends in the main along the line of the largest profile heights. The oppositely disposed main girders are interconnected via a rib.

Also in conformance with the prior art is to provide in rotor blades for wind power plants girders consisting of fibres which in the main extend in the direction of the longitudinal direction of the rotor blade and are positioned directly along the trailing edge of the rotor blade. In this case, both half-shells, which are component parts of the rotor blade, have in each case a trailing-edge girder which in accordance with the prior art are then directly adhesively fastened to each other along the trailing edge.

A disadvantage to the known rotor blades is the fact that more material has to be used for forming the trailing-edge girder than would be necessary for meeting the strength requirements since this configuration according to the prior art has a very strong tendency towards buckling instability if the trailing edge of the rotor blade is subjected to pressure load. Therefore, additional layers of fibre pre-products have to be introduced in order to achieve the required safety against buckling. Since, however, the distance between the surface of the aerodynamic pressure side of the rotor blade and its aerodynamic suction side is small, the Steiner proportion, which each additional layer of fibre pre-product creates, is also low. Therefore, the effectiveness of additional layers of fibre pre-products in the trailing edge for increasing safety against buckling instabilities is very low and a very large additional number of layers of fibre pre-products is required, which makes the rotor blade unnecessarily expensive.

SUMMARY OF THE INVENTION

It is therefore the object of the present invention to improve a rotor blade of the type referred to in the introduction to the effect that with the same safety against buckling instability and with the same external dimensions of the rotor blade less material is consumed.

It is furthermore an object of the invention to provide a method by means of which a rotor blade according to the invention can be produced.

With regard to the rotor blade, the object is achieved by means of a rotor blade referred to the introduction having the features of claim 1.

The rotor blade according to the invention has two rotor blade half-shells, produced in each case in a laminating process, which have in each case an edge which almost completely encompasses the rotor blade half-shells and along which the two rotor blade half-shells are adhesively fastened to each other. An opening, via which the rotor blade can be fastened by a connection to a rotor hub, only remains on a root of the rotor blade. Arranged in each of the two half-shells is in each case at least one trailing-edge girder, preferably just one trailing-edge girder in each case. According to the invention, the trailing-edge girders extend along the respective trailing-edge periphery of the rotor blade half-shell in a longitudinal direction, and they are of rectangular design in a cross section transversely to, preferably perpendicularly to, its longitudinal direction at least along one section in the longitudinal direction. A basically rectangular cross-sectional shape is also understood here as rectangular. The corners can be slightly rounded or the cross section can be of trapezoidal or rhombic design.

Preferably, the cross section is rectangular, preferably exactly rectangular, in certain sections. Provision can also be made for a square cross section. The rectangular cross section is preferably designed so that the trailing edge girder at least along the predominant extension along its width has a straight inside surface pointing into the rotor blade interior and a height of the rotor blade trailing-edge girder along this width is constant. On the longitudinal edges, however, the rotor blade trailing-edge girder can be of bevelled, rounded or flattened design, extending onto the rotor blade inner wall, so that no sharp or sensitive edges are exposed. Also, the previously described smooth cross sections are in this case still described as being rectangular, at least providing the straight inner surface constitutes at least half the width.

Two trailing-edge girders are preferably disposed opposite each other, and each of the two oppositely disposed trailing-edge girders has in each case along one longitudinally extending section a rectangular cross section which is transverse to, preferably perpendicular to, the longitudinal direction. A longitudinal direction of the trailing-edge girder along the respective section, which can be variable along the trailing-edge girder and can also deviate a little from the longitudinal direction of the rotor blade, is to be understood here by the longitudinal direction.

The two trailing-edge girders are disposed opposite each other if they are disposed opposite each other by their wide inner sides.

The trailing-edge girder, in the section in which the at least one trailing-edge girder is of rectangular shape in cross section, is at a greater distance from the trailing-edge periphery associated with it than in other sections.

A trailing edge of the rotor blade in the section advantageously has at most a first thickness, and the trailing-edge girder along the section is overall at a greater distance from the trailing-edge periphery than in another section in which the rotor blade has a thickness which is larger than the first thickness. The distance between two points of the rotor blade outer skin perpendicular to the rotor blade chord or to the mean camber line is understood here by the thickness. The region in which the trailing-edge girder is provided is to be understood here by the section. The trailing-edge girder is therefore at a greater distance from the trailing-edge periphery associated with it where the rotor blade has a first thickness but which is small, at least smaller than in other sections in so which the trailing-edge girder extends more closely to the trailing edge.

Each of the trailing-edge girders is preferably at such a distance from the trailing edge peripheries associated with it that a minimum distance between the two rotor blade half-shells in the region in which the trailing-edge girders are located is at least 3 mm. The clear distance between two points of the rotor blade inner skin perpendicular to the rotor blade chord or to the mean camber line is understood here by the distance.

According to the invention, the trailing-edge girder is therefore displaced, at least in certain sections, from the trailing edge in the direction of the profile nose in order to therefore realise a higher area moment of inertia of the trailing-edge girders with regard to the profile chord if the cross-sectional area of the trailing-edge girder remains unaltered in relation to an embodiment according to the prior art. At the same time, in the case of an arrangement according to the invention of the trailing-edge girders in the rotor blade it proves to be advantageous to the production flow for the cross section of the girder to be basically of rectangular design.

The trailing-edge girder advantageously extends along the trailing edge. It can therefore have different distances from the trailing edge along the longitudinal direction. The trailing-edge girder is advantageously of rectangular design in cross section where the trailing edge has a small thickness. In these sections, it can be at a greater distance from the trailing edge than in other sections.

In addition, a connection between the oppositely disposed trailing-edge girders is provided according to the invention by means of a rib or stringer. Therefore, the result is an arrangement which has a significantly improved ratio of applied mass to achieved safety against buckling.

According to the invention, the trailing-edge girder has a significantly smaller cross section than the main girder at the same distance to the blade root.

It has been proved that girders with a rectangular cross section are easier to produce than other cross-sectional shapes. Therefore, the trailing-edge girders in a preferred embodiment are of rectangular design in cross section along their longitudinal extent, preferably along their entire longitudinal extent, wherein the cross-sectional area, especially the height of the rectangle, can vary, however.

According to the invention, the trailing-edge girders, which are rectangular in cross section, are, however, no longer laid directly along the rotor blade trailing edge overall, as known in the prior art, but they have a varying distance, and in certain sections preferably greater distance, from the rotor blade trailing edge. In particular, in regions of the trailing edge which are narrow in cross section the rotor blade trailing-edge girders are at a greater distance from the rotor blade trailing-edge periphery than, for example, in the more spacious root region of the rotor blade. The fixing of the distance between trailing-edge girder and trailing edge of the rotor blade is an optimisation task in which the cross-sectional area of the trailing-edge girder and its distance to the trailing edge of the rotor blade, which fixes the distance of the trailing-edge girders from each other across the profile shape, have to be selected so that a minimum of the ratio of applied mass to achieved safety against buckling ensues.

In the aerodynamic section of the rotor blade, which is provided with a smaller height of the rotor blade interior, this greater distance from the trailing edge of the rotor blade should be made available so that the trailing-edge girders do not come into contact during the folding of the rotor blade half-shells during production and an adhesive connection between the two rotor blade half-shell edges is always possible. The two trailing-edge girders must not butt against each other in front of the rotor blade half-shell edges and prevent a complete folding of the rotor blade half-shells. The two trailing-edge girders are advantageously at such a distance from their trailing edge peripheries that there is a minimum distance of approximately 3.0 mm and a maximum distance of approximately 20 mm-50 mm between the mutually facing inner sides of the two trailing-edge girders in the profile thickness direction of the rotor blade, therefore the two trailing-edge girders do not come into contact when the rotor blades are being folded during the production process and even have a clear distance from each other which is bridged via a rib, preferably via a stringer.

On account of the greatest distance of the two trailing-edge girders of between preferably 2 cm to 5 cm, it is advisable to connect the trailing-edge girder of the suction-side rotor blade half-shell to the trailing-edge girder of the pressure-side rotor blade half-shell by means of a stringer instead of a rib.

In the case of a stringer, it is preferably also a fibre composite component which in cross section, however, is not of rectangular design, like a rib, with a height which is greater by a multiple than a width but in which the height of the component is smaller than the width of the component. Therefore, the height of the stringer is for example 2 cm to 5 cm, whereas the width of the stringer is about 20 cm to 30 cm. Overall height and width vary, however, along the longitudinal extent of the rotor blade.

In a particularly advantageous embodiment of the invention, the stringer has a trapezoidal cross section, as a result of which it can be easily integrated during the production of the corresponding blade shell, e.g. during the infusion.

The two trailing-edge girders of the two rotor blade half-shells preferably have a width of 20 cm to 30 cm. The width of the trailing-edge girders is in the main constant, preferably exactly constant, over the entire longitudinal extent of the trailing-edge girder. As a result, a simple production of the trailing-edge girder is possible.

The trailing-edge girder is expediently formed from a plurality of layers of a fibre pre-product laid one on top of the other and/or next to each other. In the case of the fibre pre-product, it can be a structure consisting of natural fibres, plastic fibres, glass fibres or carbon fibres or the like, which is impregnated with resin and then hardened. The design according to the invention of the rotor blade is intended to also comprise other forms of fibre pre-products, however, such as prepregs and pultrudates.

The number of layers of the trailing-edge girder which are laid one on top of the other is adapted to the requirement for strength and safety against buckling in the respective rotor blade section.

The trailing-edge girders preferably have a height of less than 1 cm at the root-side or tip-side ends and up to 7-10 cm at their thickest point.

With regard to the method, the object is achieved by means of a method having the features of claim 11. The method is especially suitable for producing one of the aforesaid rotor blades.

Rotor blades are preferably assembled from separately produced components, such as rotor blade half-shells, ribs, stringers and girders. The separate components are in this case produced in production moulds which are individually designated for them. In the production moulds, a plurality of layers, for example fibrous layers consisting of glass fibres and/or carbon fibres and/or plastics and/or even natural materials as well as foams and balsa, etc., are first of all laid one on top of the other and next to each other. The layers arranged in this way form a preferably dry pre-product. In the method, such as the resin injection moulding process (RIM process) or resin transfer moulding process (RTM process), the pre-product is impregnated with a resin system. After hardening of the resin system, the components are adhesively fastened to each other and the rotor blade finished. However, production methods such as the use of prepregs and pultrudates are also included in the production according to the invention of the rotor blade.

Particularly with regard to the production of the girders, it is preferably provided that the girders are already an integral component of the rotor blade half-shells, that is to say are integrally co-produced during the production process of the rotor blade half-shells. They can, however, also be adhesively fastened to the inner sides of the rotor blade half-shells retrospectively or can be introduced as prefabricated components during the production of the rotor blade half-shells.

In particular, the trailing-edge girders expediently extend as close as possible to the rotor blade trailing edge in order to increase the strength in the pivoting direction to a particularly high degree. In this case, however, the problem arises that especially in the aerodynamic region of the rotor blade along the rotor blade trailing edge only very little free interior space, especially not very high interior space, is made available in the rotor blade. This especially leads to the rotor blade trailing-edge girders according to the prior art being flattened or rounded towards the trailing edge at least along its longitudinal side pointing to the rotor blade trailing edge so that during the folding and adhesive fastening together of the two rotor blade half-shells they do not butt against each other and prevent a complete adhesive fastening of the rotor blade half-shells. As a result, in the case of the prior art a very low safety, often excessively low safety, against buckling ensues so that additional material has to be provided in the trailing-edge girders, which increases the cost of the rotor blade.

Customarily, and also according to the invention, the rotor blade half-shells are produced in separate mould half-shells which are arranged next to each other and can be swung onto each other via a jointed connection. This hinged mechanism enables the almost completely encompassing edges of the two rotor blade half-shells to be accurately positioned one on top of the other and after application of an adhesive layer along the two edges, or at least one of the two edges, to be adhesively fastened to each other.

Before the folding of the two mould half-shells, the ribs, stringers and girders are expediently also adhesively fastened into the rotor blade half-shells.

The method according to the invention makes use of the idea of producing the trailing-edge girders by means of preferably precise arranging of layers one on top of the other, so i.e. fibre layers consisting of most diverse materials, wherein the pre-product which is formed from the layers which are arranged one on top of the other is infused, e.g. with a resin system, which then hardens. Other production methods, such as the use of prepregs or pultrudates, are also conceivable. A rectangular cross section of the trailing-edge girder is created, wherein the trailing-edge girder naturally has to be adapted to the aerodynamic shape of the rotor blade inner wall along the longitudinal extent, that is to say does not extend exactly in a straight line especially in the longitudinal direction but follows the trailing edge and the surface of the rotor blade in an arc-like manner so that it can be integrated overall into the blade shell structure.

The trailing-edge girders, however, have a distance from the trailing-edge periphery, at least in the aerodynamic section. A distance of a longitudinal edge of the trailing-edge girder, which is adjacent to the trailing-edge periphery, from said trailing-edge periphery, which is not zero but preferably a few centimetres, is understood here by a distance. Layers are laid one on top of the other in such number that the trailing-edge girder has a thickness of 1 cm to 10 cm, preferably up to 7-8 cm, after the resin infusion.

The rotor blade trailing-edge girder can be designed in one piece or in a multiplicity of pieces, wherein the individual pieces are then together adhesively fastened into the rotor blade half-shells and interconnected.

The individual fibre layers of the rotor blade trailing-edge girder preferably have a constant width so that the longitudinal edges of the fabric layers are positioned exactly one on top of the other, wherein bevels for removal from the mould can be provided.

It has been shown that with a constant cross-sectional area of the rotor blade trailing-edge girder this rectangular shape has a higher degree of safety against buckling even with a greater distance from the rotor blade trailing edge than conventional girders, extending exactly along the rotor blade trailing edge, with bevelled or rounded longitudinal edges.

The inner sides of the trailing-edge girders which are oppositely disposed in the rotor blade interior are especially preferably connected by stringers. Stringers, on account of their larger width compared with ribs and the preferably trapezoidal cross section, are simpler to realise than ribs in the construction of the blade shell.

BRIEF DESCRIPTION OF THE DRAWINGS

The invention is described in six figures based on an exemplary embodiment. In this case, in the drawing.

DETAILED DESCRIPTION OF THE SEVERAL EMBODIMENTS

Figure 1:
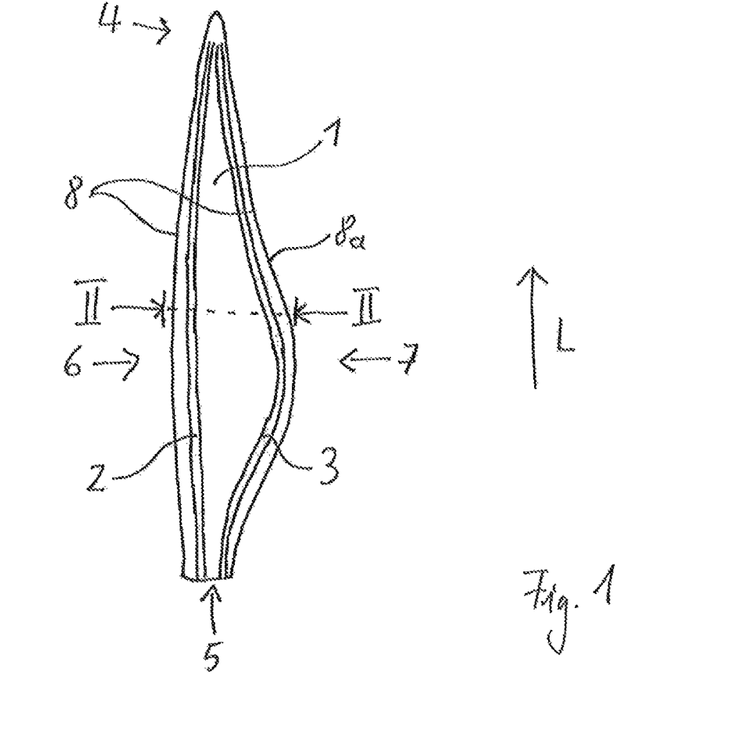
FIG. 1 shows an internal view of a conventional rotor blade having a main girder and a trailing-edge girder.

Shown in FIG. 1 is a suction-side rotor blade half-shell 1 of a conventional rotor blade. FIG. 1 shows an internal view of the rotor blade half-shell 1. The figures are not accurate to scale.

Rotor blades are preferably assembled from separately produced components such as rotor blade half-shells 1, girders, ribs or stringers. The separate components are produced in production moulds which are individually designated for them. In the production moulds, a plurality of layers, for example fibrous layers, foams, balsa, etc. are first of all laid one on top of the other and/or next to each other. The layers arranged in this way form a preferably dry pre-product. The pre-product lies on an inner side of a production mould and on the side facing away from the production mould is adhesively fastened to a vacuum film. The production mould or the vacuum film has a multiplicity of inlet openings and outlet openings. In the method, such as the RIM method (resin injection moulding) or the RTM method (resin transfer moulding), the pre-product is impregnated with a resin system. To this end, the pre-product, under the vacuum film, i.e. between inner wall of the production mould and the vacuum film, is subjected to a negative pressure by air being sucked out through the outlet openings. Also as a result of the negative pressure the liquid or viscous resin system is sucked into the pre-product and completely soaks the pre-product. The process is carried out until the resin system also escapes from the outlet openings. However, prepregs and/or pultrudates can also be used.

According to the prior art, the rotor blade half-shells 1 are produced individually and in one piece in each case. Modern rotor blades have lengths of between 40 m and 60 m and up to 75 m, and even more. For their production, production moulds with corresponding lengths of up to 70 m, 75 m, or even still longer production moulds, can be provided.

After the hardening of the rotor blade half-shells 1, a main girder 2 and a trailing-edge girder 3 are adhesively fastened in each case to the inner side of the two rotor blade half-shells. In FIG. 1, an inner side of one of the two rotor blade half-shells of a rotor blade is shown. In FIG. 1, the suction-side rotor blade half-shell 1 is shown. It is also possible, however, according to the invention to position the trailing-edge girder 3 as a premanufactured component in the corresponding production mould during the production of the rotor blade half-shells and, if necessary, to connect the trailing-edge girder to the other layers and materials by infusion.

Each of the rotor blade half-shells 1 has a tip-side end 4 and a root-side end 5 and also a leading edge 6 and a trailing edge 7. The corresponding nomenclature also refers to the rotor blade which is assembled from two rotor blade shells.

The rotor blade half-shell 1 is provided in an almost completely encompassing manner with a rotor blade half-shell edge 8 which has a width of preferably 3 to 25 cm. The edge 8 extends along the rotor blade leading edge 6 around the tip-side end 4 of the rotor blade half-shell 1 and along the entire rotor blade trailing edge 7. The two rotor blade half-shells 1 each have the edge 8 and the rotor blade half-shells 1 are adhesively fastened to each other along their two edges 8. The width of the edge 8 can vary in areas, wherein the transitions are then preferably constructed in a continuous manner. For this purpose, the production moulds are arranged next to each other, and a foldable mould half-shell can be swung over a positionally fixed mould half-shell so that after production of the two rotor blade half-shells in the two mould half-shells and their hardening and also possibly after the adhesive fastening of further components such as girders and ribs, the foldable mould half-shell can be folded over the positionally fixed mould.

It is also conceivable that both mould half-shells can be folded at the same time or one after the other and closed onto each other.

An adhesive is applied to the rotor blade half-shell, which is produced in the positionally fixed mould half-shell, along the entire rotor blade half-shell edge 8. The two rotor blade half-shells 1 are adhesively fastened along their two edges 8 with the aid of the adhesive. For pressing the two mould half-shells together, provision can be made on the mould half-shells for clamping fasteners which create a sufficient pressure between the two rotor blade half-shells 1 and therefore upon the adhesive mass.

The main girder 2 is laid along the line of the largest profile thickness. The main girder 2 can be produced separately or can be formed integrally on the inner side of the rotor blade half-shell 1 during the production process of said rotor blade half-shell 1.

The main girder 2 and the trailing-edge girder 3 also have fibre layers which extend in a longitudinal direction L, wherein the fibre layers of the girders 2, 3 and also of the rotor blade half-shells 1 or of the ribs can feature glass fibres, carbon fibres, fibres with plastic content, natural fibres and also other types of fibres. The individual fibre layers can be designed in one piece in each case. In the case of long girders 2, 3, it can also be expedient, however, to produce the girders 2, 3 piece by piece along the longitudinal direction L only assemble them in the rotor blade half-shell 1. The same also applies to the other components.

The girders 2, 3 are also impregnated with resin in a vacuum infusion process, hardened, and then adhesively fastened to the inner side of the rotor blade half-shell 1 or formed integrally during the production process of the rotor blade half-shell 1. According to the invention, it is also possible, however, to premanufacture the girders 2, 3 and then to integrate them during the construction of the half-shell by them being connected to the other materials of the rotor blade half-shell for example during the infusion. The main girder 2 serves for increasing the flexural strength of the rotor blade in the impact direction.

The previous discussions do not only relate to the rotor blades according to the prior but also to the rotor blades according to the invention.

In addition, according to the prior art the trailing-edge girder 3 is laid along a rotor blade half-shell trailing-edge periphery 8a. The trailing-edge girder 3 extends directly along the trailing edge 7 at a distance of a few centimetres from the edge 8, preferably at a distance of at most three to four centimetres. The distance of the trailing-edge girder 3 from the rotor blade half-shell trailing-edge periphery 8a is in the main constant over the entire longitudinal extent of the trailing-edge girder 3 according to the prior art, but in any case is very small and is at a few centimetres. The trailing-edge girder 3 according the invention extends along a line in the rotor blade half-shell 1 which differs from the known trailing-edge girder 3.

Figure 2:
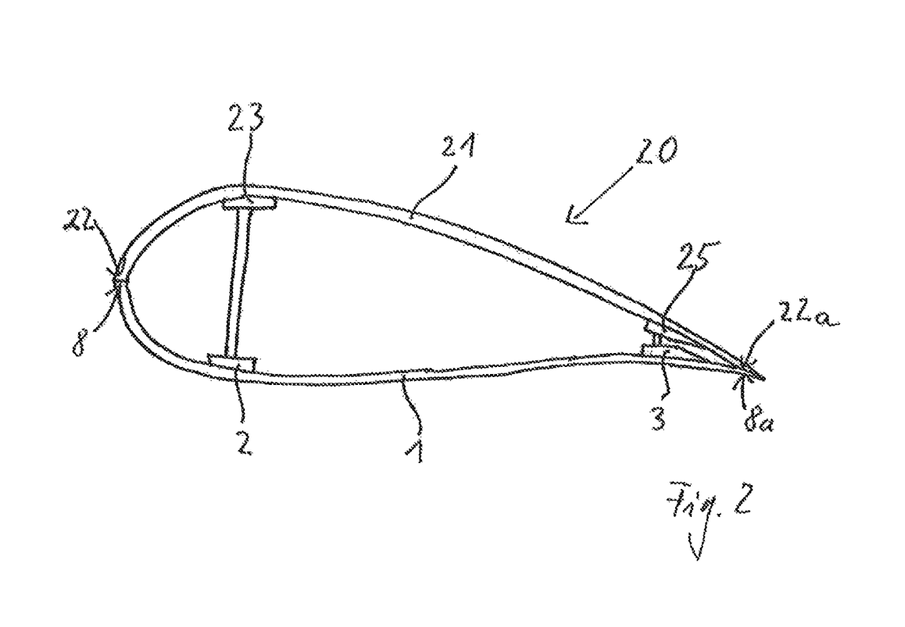
FIG. 2 shows a sectional view of a conventional rotor blade along the line II-II of FIG. 1.

FIG. 2 shows a cross section of a rotor blade 20 according to the prior art along a line which has approximately the height of the cross-sectional line II-II drawn in in FIG. 1. However, in FIG. 1 only one rotor blade half-shell 1 is drawn in, whereas FIG. 2 shows a cross section of the complete rotor blade 20. The two rotor blade half-shells 1, 21 have in each case an associated rotor blade half-shell edge 8a, 22a, and they are adhesively fastened to each other along their rotor blade half-shell edges 8a, 22a.

In this case, the two main girders 2, 23 are disposed opposite each other, approximately parallel to each other, inside the rotor blade 20. Via a rib 24, which is also produced separately in a laminating process, the two main girders 2, 23, are adhesively fastened to each other by means of two adhesive connections between rib longitudinal sides and girder inner sides. The rib 24 on its longitudinal sides has adhesive lips which create a larger contact area between main girder 2, 23 and rib 24. Since the trailing-edge girders 3, 25 are arranged very close to the respective trailing-edge periphery 8a, 22a and are also arranged close to the respective rotor blade half-shell trailing-edge periphery 8a, 22a in the aerodynamic region of the rotor blade 20, which is in the centre in the longitudinal direction L, the two trailing-edge girders 3, 25 have to be bevelled toward the trailing-edge periphery 8a, 22a so that when the two rotor blade half-shells 1, 21 are folded onto each other the two trailing-edge girders 3, 25 do not come into contact, especially do not come into contact earlier than the two rotor blade half-shell trailing edge peripheries 8a, 22a and therefore make an adhesive fastening impossible or least hinder an adhesive fastening. In FIGS. 1 and 2, the two trailing-edge girders 3, 25 in cross section are of approximately semi-lenticular design or of a slightly inwardly curved design.

Figure 3:
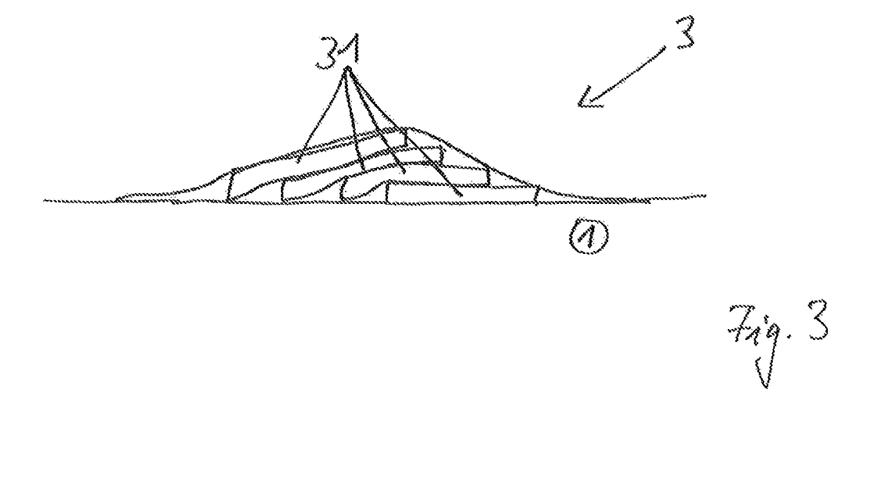
FIG. 3 shows a sectional view of a construction of a trailing-edge girder according to the prior art.

Shown in FIG. 3 is a known construction of the trailing-edge girder 3. In this case, fibre layers 31 of approximately constant width, preferably exactly of constant width, are laid not exactly one on top of the other, but laid one on top of the other in a staggered manner along a width B of the rotor blade 20 or of the rotor blade half-shell 1, 21 so that in a middle region, as seen along the width B, more fibre layers are overlaid than on longitudinal edges of the trailing-edge girders 3, 25, that is to say the further distance along the width in the direction of the leading edge 6 and the trailing edge 7 the fewer are the fibre layers 31 which are laid one on top of the other, and therefore a semi-lenticular shape in cross section is created. The semi-lenticular shape is created after the infusion with the resin system by the fibre layers being infused with a resin system.

Figure 4:
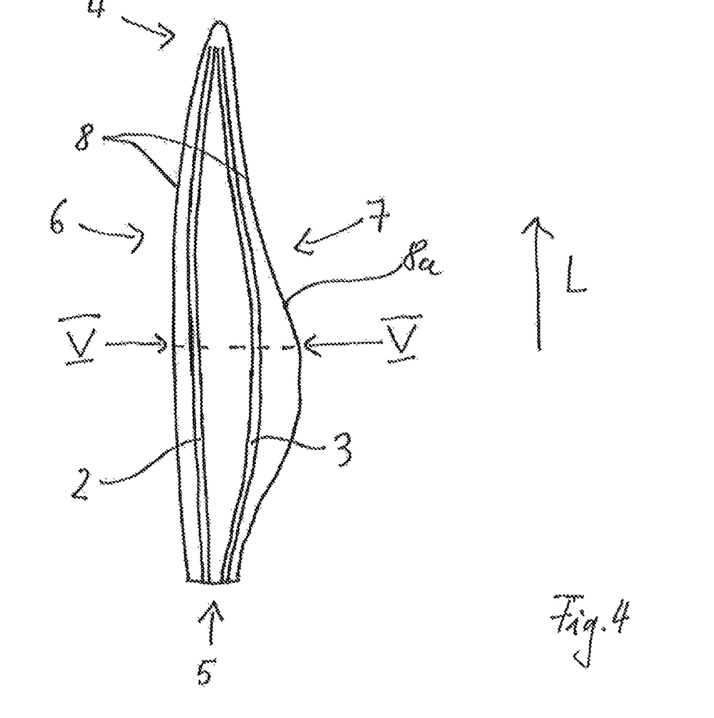
FIG. 4 shows an internal view of a rotor blade half-shell according to the invention having a main girder and a trailing-edge girder according to the invention.

FIG. 4 shows a rotor blade half-shell 1 according to the invention. What was said in relation to FIG. 1, 2, 3, apart from the arrangement of the trailing-edge girder 3, can also be transferred to the rotor blade 20 according to the invention. Therefore, the same designations are also selected.

The rotor blade half-shells 1, 21 themselves can be produced in a conventional production process, e.g. in the infusion process. By the same token, the main girders 2, 23 can be produced in a known manner. The position of the two trailing-edge girders 3, 25 in the two rotor blade half-shells 1, 21 differs from the prior art according to FIG. 1 and FIG. 2.

The trailing-edge girder 3 according to FIG. 4 is initially no longer routed closely along the trailing-edge periphery 8a along the entire longitudinal direction L of the rotor blade half-shell 1 but it preferably has a different distance from the trailing-edge periphery 8a. In the aerodynamic region of the rotor blade, the distance from the trailing-edge periphery 8a is greater than in the region of the root-side end 5.

Figure 5:
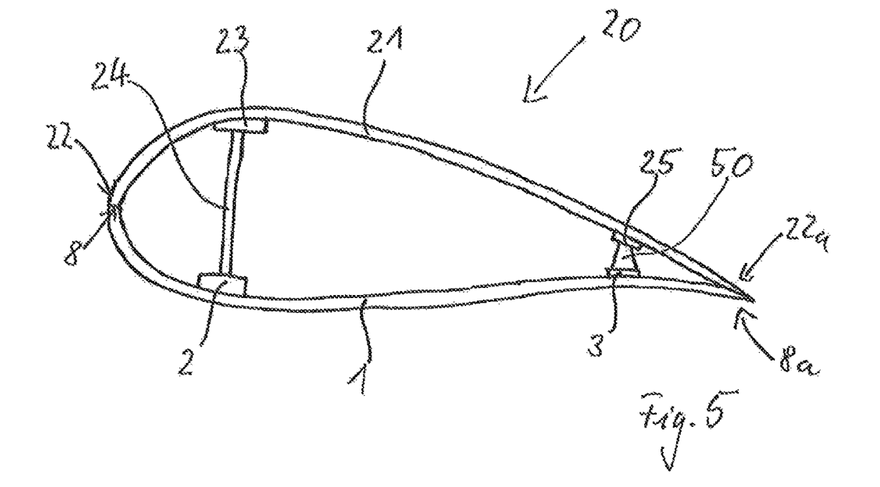
FIG. 5 shows a sectional view of a rotor blade according to the invention along a line V-V in FIG. 4.

FIG. 5 shows a cross section according to the invention of a rotor blade 20 according to the invention along a line which is arranged approximately at the height V-V in FIG. 4, wherein in FIG. 4 just one rotor blade half-shell 1 is shown, whereas in FIG. 5 a cross section of an entire rotor blade 20 is shown. The two trailing-edge girders 3, 25, in comparison to FIG. 2, are at a greater distance from the trailing edge peripheries 8a, 22a, and the two trailing-edge girders 3, 25 especially being at such a distance from the rotor blade trailing edge 7 that in cross section they are of rectangular, preferably exactly rectangular, design. The distance from the rotor blade half-shell trailing-edge periphery 8a, 22a is in each case dimensioned so that when the two rotor blade half-shells 1, 21 are folded onto each other both trailing-edge girders 3, 25, despite the rectangular shape of the two trailing-edge girders 3, 25 in cross section, the two trailing-edge girders 3, 25 do not come into contact, whereas, however, the two trailing-edge peripheries 8a, 22a are disposed so closely opposite that they can be adhesively fastened to each other. The two trailing-edge girders 3, 25 are interconnected by means of a stringer 50 via adhesive connections.

Figure 6:
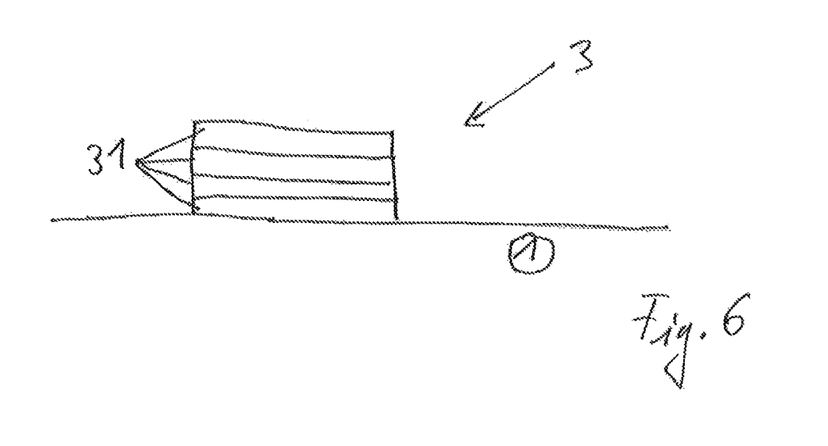
FIG. 6 shows a sectional view of the construction of a trailing-edge girder according to the invention.

FIG. 6 shows the cross section of one of the trailing-edge girders 3, 25 according to the invention. The layer construction can be selected in a known manner, i.e. the type of material of the layers and the number of layers can be selected according to the prior art like the construction in FIG. 3. However, compared with the prior art different layer sequences and a different number of layers can also be selected. However, it is essential to the invention that the individual layers are no longer positioned one on top of the other in a staggered manner, but positioned exactly one on top of the other so that their lateral edges are arranged parallel one on top of the other and perpendicularly to the inner side of the rotor blade half-shell 1. As a result, an essentially rectangular shape of the trailing-edge girders 3, 25 in cross section is formed in contrast to the prior art. Trailing-edge girders 3, 25 which are rectangular in cross section, in comparison to the girders which are semi-lenticular in cross section, have a higher buckling stiffness with the same cross-sectional areas. The trailing-edge girders 3, 25 are then buckling critical if the tip-side end 4 is bent in the direction of the trailing edge 7 as a result of external forces opposite to the rotational direction of the rotor and the trailing edge 7 is consequently under a pressure load. It has been shown that with the same cross-sectional area trailing-edge girders 3, 25 which are rectangular in cross section have a higher buckling stiffness than trailing-edge girders 3, 25 which are semi-lenticular in cross section. As a result of the invention, material can be saved without the safety against buckling of the trailing edge or of the trailing-edge girders of the rotor blade being reduced.

LIST OF DESIGNATIONS

1 Rotor blade half-shell
2 Main girder
3 Trailing-edge girder
4 Tip-side end
5 Root-side end
6 Rotor blade leading edge
7 Rotor blade trailing edge
8 Rotor blade half-shell edge
8a Rotor blade half-shell trailing-edge periphery
20 Rotor blade
21 Rotor blade half-shell
22 Rotor blade half-shell edge
22a Rotor blade half-shell trailing-edge periphery
23 Main girder
24 Rib
25 Trailing-edge girder
31 Fibre layers
50 Stringer
L Longitudinal direction
B Width

What is claimed is:

1. Rotor blade of a wind power plant having two rotor blade half-shells (1, 21) with in each case a leading-edge periphery and a trailing-edge periphery (8a, 22a), which are adhesively fastened to each other along the leading-edge and trailing-edge peripheries (8a, 22) and which have in case at least one trailing-edge girder (3, 25), characterised in that at least one of the trailing-edge girders (3, 25) at least along one section in a longitudinal direction (L) has a rectangular cross section transversely to said longitudinal direction (L) the two trailing edge-girders (3, 25) are adhesively fastened to the inner side of the two rotor blade half shells (1, 21) and are interconnected by means of a stringer (50) via adhesive connections and the trailing-edge girder (3, 25), in the section in which the trailing-edge girder (3, 25) is of rectangular shape in cross section, is at a greater distance from the trailing-edge periphery (8a, 22a) associated with it than in other sections.

2. Rotor blade according to claim 1, characterised in that two trailing-edge girders (3, 25) are oppositely disposed and each of the trailing-edge girders (3, 25) in a longitudinal direction (L) has a rectangular cross section transversely to said longitudinal direction (L).

3. Rotor blade according to claim 1, characterised in that in the section a trailing edge (7) of the rotor blade (20) has at most a first thickness and along the section the trailing-edge girder (3, 25) is overall at a greater distance from the trailing-edge peripheries (8a, 22a) than in another section in which the rotor blade (20) has a greater thickness than the first thickness.

4. Rotor blade according to claim 1, characterised in that each of the trailing-edge girders (3, 25) is at such a distance from the trailing-edge peripheries (8a, 22a) associated with them that a minimum distance between the two rotor blade half-shells (1, 21) in the region in which the trailing-edge girders (3, 25) are located is at least 3 mm.

5. Rotor blade according to claim 1, characterised in that a greatest distance between the two rotor blade half-shells (1, 21) in the region in which the trailing-edge girders (3, 25) are located is at most 5-6 cm.

6. Rotor blade according to claim 1, characterised in that a stringer (50), extending along the longitudinal extent of the two trailing-edge girders (3, 25), is arranged at least in certain sections between oppositely disposed trailing-edge girders (3, 25).

7. Rotor blade according to claim 1, characterised in that each of the two trailing-edge girders (3, 25) has a width (B) of 20 cm to 40 cm.

8. Rotor blade according to claim 1, characterised in that each of the two trailing-edge girders (3, 25) has a height of 1 mm to 80 mm.

9. Rotor blade according to claim 1, characterised in that a greatest distance of each of the two trailing-edge girders (3, 25) from the trailing-edge periphery (8a, 22a) is at most 20 cm to 60 cm.

10. Rotor blade according to claim 7, characterised in that each of the two trailing-edge girders (3, 25) has a width (B) of 20 cm-30 cm.

11. Rotor blade according to claim 9, characterised in that a greatest distance of each of the two trailing-edge girders (3, 25) from the trailing-edge periphery (8a, 22a) is at most 30 cm-45 cm.

12. Method for producing a rotor blade, by two rotor blade half-shells being produced and along trailing-edge peripheries (8a, 22a) of both rotor blade half-shells (1, 21) by a trailing-edge girder (3, 25) being laid in each case, by layers (31) of constant width being positioned one on top of the other by their longitudinal edges and then by a resin system being infused into the layers (31) and the two trailing-edge girders (3, 25) are adhesively fastened to the inner side of the two rotor blade half shells (1, 21) and are interconnected by means of a stringer (50) via adhesive connections.

13. Method for producing a rotor blade according to claim 12, characterised in that the trailing-edge girders (3, 25) are produced separately from the rotor blade half-shells (1, 21) and are then adhesively fastened to each other.

14. Method for producing a rotor blade according to claim 12, characterised in that the trailing-edge girders (3, 25) are produced separately from the rotor blade half-shells (1, 21) and are then integrated during the construction of the rotor blade half-shells (1, 21).

\* \* \* \* \*